(12) United States Patent
Zemer et al.

(10) Patent No.: US 12,265,438 B2
(45) Date of Patent: Apr. 1, 2025

(54) DYNAMIC INTERFACE CIRCUIT TO REDUCE POWER CONSUMPTION

(71) Applicant: Apple Inc., Cupertino, CA (US)

(72) Inventors: Tzach Zemer, Haifa (IL); Lior Zimet, Kerem Maharal (IL); Sagi Lahav, Kiryat Bialik (IL)

(73) Assignee: Apple Inc., Cupertino, CA (US)

( * ) Notice: Subject to any disclaimer, the term of this patent is extended or adjusted under 35 U.S.C. 154(b) by 115 days.

(21) Appl. No.: 18/175,900

(22) Filed: Feb. 28, 2023

(65) Prior Publication Data

US 2024/0085968 A1    Mar. 14, 2024

Related U.S. Application Data

(60) Provisional application No. 63/375,528, filed on Sep. 13, 2022.

(51) Int. Cl.
| | | |
|---|---|---|
| *G06F 1/3206* | (2019.01) |
| *G06F 1/08* | (2006.01) |
| *G06F 1/3234* | (2019.01) |
| *H04W 52/02* | (2009.01) |

(52) U.S. Cl.
CPC ............ *G06F 1/3206* (2013.01); *G06F 1/08* (2013.01); *G06F 1/3234* (2013.01); *H04W 52/02* (2013.01)

(58) Field of Classification Search
CPC ......... G06F 1/3206; G06F 1/08; G06F 1/3234
See application file for complete search history.

(56) References Cited

U.S. PATENT DOCUMENTS

| | | | |
|---|---|---|---|
| 7,353,362 B2 * | 4/2008 | Georgiou | H04L 49/109 712/32 |
| 10,509,762 B2 | 12/2019 | Peleska et al. | |
| 11,048,552 B2 | 6/2021 | Leyrer et al. | |
| 11,287,871 B2 * | 3/2022 | Rotem | G06F 1/324 |
| 2015/0198987 A1 * | 7/2015 | Park | H02M 3/156 713/300 |
| 2019/0317911 A1 | 10/2019 | Chun et al. | |
| 2022/0199600 A1 * | 6/2022 | Zhang | G02B 6/4268 |

* cited by examiner

*Primary Examiner* — Raymond N Phan

(74) *Attorney, Agent, or Firm* — Robert C. Kowert; Kowert, Hood, Munyon, Rankin & Goetzel. P.C.

(57) ABSTRACT

A system for a given device may include a plurality of systems on a chip (SOCs). Each SOC may include an interface circuit and a bridge circuit for communicating with other SOCs. The interface circuit of an SOC may include a plurality of communication devices to transfer data packets from/to the SOC to the other SOCs. The bridge circuit may provide various control functions for the interface circuit. An indication may be generated when the system enters an idle mode. In response, the bridge circuit may generate signal(s) to cause some of the communication devices of the interface circuit into a low power state. The interface circuit may obtain the signal(s) and accordingly transition some of the communication devices to the low power state.

20 Claims, 9 Drawing Sheets

DYNAMIC INTERFACE CIRCUIT TO REDUCE POWER CONSUMPTION

This application claims benefit of priority to U.S. Provisional Application Ser. No. 63/375,528 entitled "Dynamic Interface Circuit to Reduce Power Consumption," filed Sep. 13, 2022, and which is hereby incorporated herein by reference in its entirety.

BACKGROUND

Technical Field

Embodiments described herein are related to a system on a chip (SOC) and, more particularly, to interface coupling multiple SOCs.

Description of the Related Art

System on a chip (SOC) integrated circuits (ICs) generally include one or more processors that serve as central processing units (CPUs) for a system, along with various other components such one or more graphic processing units (GPUs), memory controllers and peripheral components. A given device may include multiple SOCs, together with additional components (e.g., a display, a keyboard, etc.).

Energy efficiency is an important parameter of devices. Sometimes, it is desirable for a device to meet energy efficiency standards, e.g., the Energy Star standard. However, as the complexity and number of components on SOCs of a device increase, it can become more and more challenging for the device to meet the energy efficiency requirement. Therefore, a technique to reduce power consumption of a device, including SOCs of the device, is desirable.

BRIEF DESCRIPTION OF THE DRAWINGS

The following detailed description refers to the accompanying drawings, which are now briefly described.

Figure 1:
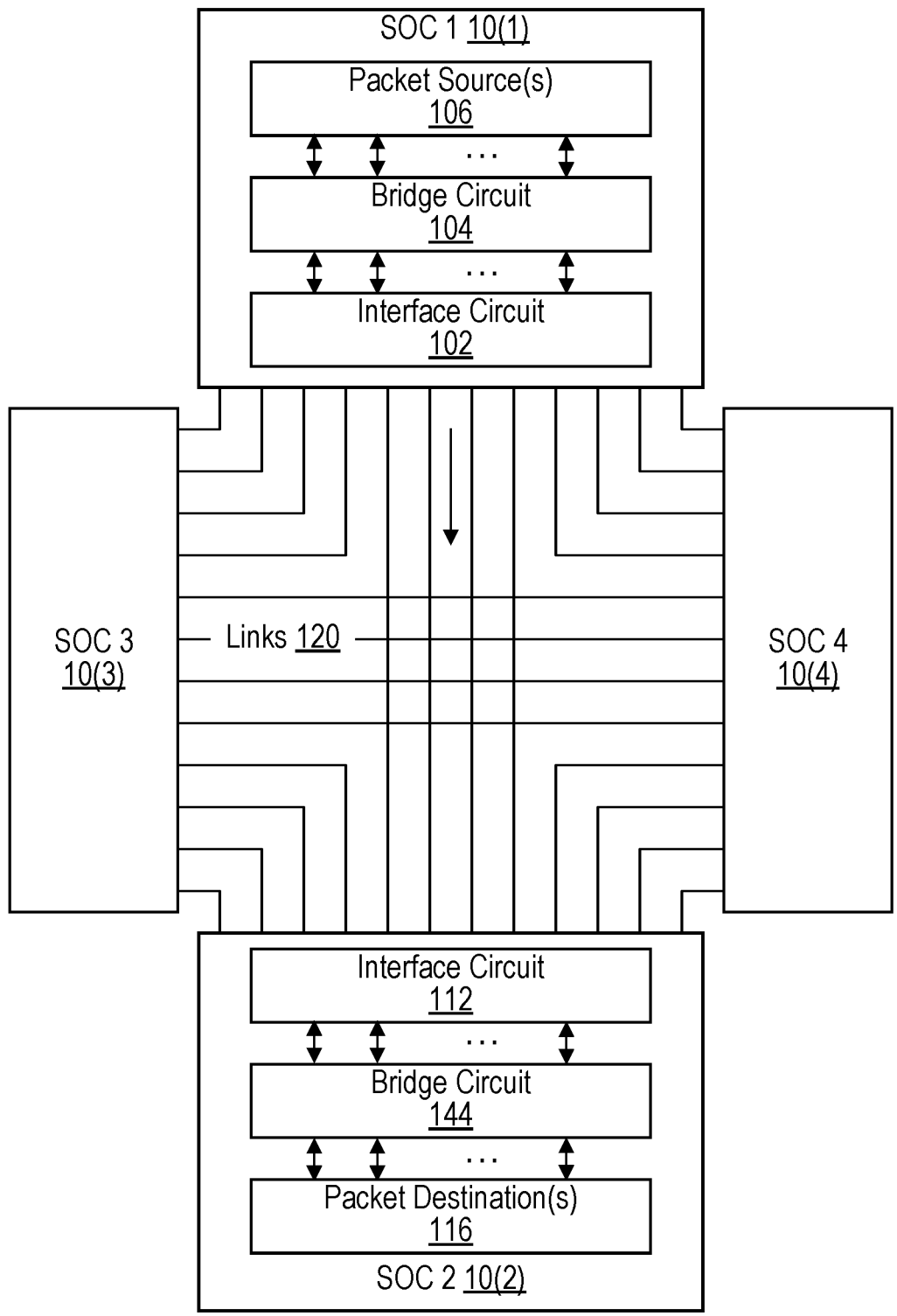
FIG. 1 is a block diagram of a system including multiple SOCs according to some embodiments.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description.

DETAILED DESCRIPTION OF EMBODIMENTS

Various embodiments to dynamically control an interface circuit of a system on a chip (SOC) to reduce power consumption of the SOC are described in this disclosure. An SOC may include a semiconductor die, on which one or more integrated circuits (ICs) may be formed. The ICs of an SOC may include various components, e.g., one or more processors, graphic processing units (GPUs), memory controllers, peripheral components, etc. Multiple SOCs, together with additional components (e.g., a display, a keyboard, etc.), may form a system for a given device, such as a computer, tablet, smartphone, wearable device, etc. In some embodiments, each SOC may include at least one interface circuit for communicating with other SOCs within the system. The interface circuit of an SOC may include a plurality of communication devices, e.g., transmitters, receivers, and/or transceivers, to transfer (e.g., transmit and/or receive) data packets between the SOC and the other SOCs.

In some embodiments, the system may enter a low power state. For example, the system may enter an idle mode, while the system may be still on but not process any heavy workloads. In some embodiments, the idle mode may include idling of the GPUs, CPUs, and/or other SOC components. For example, in an idle mode, the display of the system may stay on, but the GPUs of the device may enter a low power state or be turned off, since only "repeated" images need to be displayed and no further graphic signals need to be processed by the GPUs. As a result, the traffic and number of data packets needed to be transferred between the SOCs of the system may be reduced. Accordingly, only a partial part of the communication devices of the interface circuit of an SOC may be sufficient to meet the traffic bandwidth requirement. Therefore, in some embodiments, when a system enters a low power mode, the interface circuit of an SOC of the system may be dynamically controlled to transition some of the communication devices of the interface circuit into a low power state. This may reduce power consumption of the interface circuit, thus improving energy efficiency for the SOC and overall system.

Turning now to FIG. 1, a block diagram of a system including multiple SOCs according to some embodiments is shown. As indicted in this example, system 100 may include a plurality of SOCs, e.g., SOCs 10(1)-10(4). In some embodiments, the SOCs 10(1)-10(4) may individually be implemented on respective semiconductor dies or "chips".

In some embodiments, the semiconductors of the SOCs 10(1)-10(4) may be coupled with each other through one or more external wires (also called links) 120, as shown in FIG. 1. In some embodiments, external links 120 may be serial communication links. In some embodiments, each SOC 10 of system 100 may include various components, e.g., one or more processors, graphic processing units (GPUs), memory controllers, peripheral components, etc. In addition, each SOC 10 may include a plurality of independent networks between the components on the SOC 10. The networks may be physically independent (e.g., having dedicated wires and other circuitry that form the network) and logically independent (e.g., communications sourced by components in the SOC may be logically defined to be transmitted on a selected network of the plurality of networks and may not be impacted by transmission on other networks). By providing physically and logically independent networks, high bandwidth may be achieved via parallel communication on the different networks. Additionally, different traffic may be transmitted on different networks, and thus a given network may be optimized for a given type of traffic. For example, processors such as central processing units (CPUs) in an SOC may be sensitive to memory latency and may cache data that is expected to be coherent among the processors and memory. Accordingly, a CPU network may be provided to transfer packets between CPUs and the memory controllers controlling access to memory devices. The CPU network may be optimized to provide low latency. For example, there may be virtual channels for low latency requests and bulk requests, in an embodiment. The low latency requests may be favored over the bulk requests in forwarding around the fabric and by the memory controllers. The CPU network may also support cache coherency with messages and protocol defined to communicate coherently. Another network may be an input/output (I/O) network. This network may be used by various peripheral devices ("peripherals") to communicate with CPUs and/or memory controllers. The network may support the bandwidth needed by the peripherals and may also support cache coherency. However, I/O traffic may sometimes have significantly higher latency than CPU traffic. By separating the I/O traffic from the CPU to memory traffic, the CPU traffic may be less affected by the I/O traffic. Yet another network may be a relaxed order network. The CPU and I/O networks may both support ordering models among the communications on those networks that provide the ordering expected by the CPUs and peripherals. However, the relaxed order network may be non-coherent and may not enforce as many ordering constraints. The relaxed order network may be used, for example, by graphics processing units (GPUs) to communicate with memory controllers. Thus, the GPUs may have dedicated bandwidth in the networks and may not be constrained by the ordering required by the CPUs and/or peripherals. Other embodiments may employ any subset of the above networks and/or any additional networks, as desired.

The above-described networks of an SOC 10 may form an on-SOC local communication fabric for the SOC. In some embodiments, each SOC 10 may include at least one interface circuit and one bridge circuit to couple the local communication fabric of the SOC to other SOCs of system 100. For example, as indicated in FIG. 1, SOC 10(1) may include interface circuit 102 and bridge circuit 104. Interface circuit 102 may interface SOC 10(1) with external wires (also called links) 120 that may be further coupled with SOCs 10(2)-10(4). Interface circuit 102 may transfer, e.g., transmit and/or receive, data packets from/to SOC 10(1) to/from other SOCs 10(2)-10(4) via external links 120. For example, as indicated in FIG. 1, interface circuit 102 may transfer packets from packet source(s) 106 of SOC 10(1) to SOC 10(2), and packet destination(s) 116 of SOC 10(2) may receive the packets through interface circuit 112 of SOC 10(2). Vice versa, packets may be transferred in the opposite direction from SOC 10(2) to SOC 10(1) through the interface circuits. Similarly, packets may be transferred in one and/or both directions between SOC 10(1), SOC 10(2) and other SOCs 10(3) and 10(4). As described below in FIG. 4, the above described packets transferred between the SOCs may include a collection of packets from/to multiple heterogenous local networks of the respective SOCs. In some embodiments, interface circuit 102, under control of bridge circuit 104, may provide the necessary interface for each SOC with the external link 120. In some embodiments, interface circuit 102 may preserve corresponding different communication requirements imposed by the heterogenous networks upon the packets, such that state transitions of interface circuit 102 may be transparent to networks of the SOCs and may not necessarily affect operations of the networks.

Bridge circuit 104 may be responsible for bridging between the local communication fabric and interface circuit 102 of SOC 10(1). Bridge circuit 104 may convert communications between the local communication fabric of SOC 10(1) and the external components of SOC 10(1) (e.g., links 120). In addition, bridge circuit 104 may provide control functions, e.g., data packing and unpacking, packet routing and data path control, power state control (of interface circuit 102), configurations, etc.

The above-described communication systems of the SOCs can provide several benefits. One, as indicated in the example in FIG. 1, SOCs 10(1)-10(4) may each include a local on-SOC communication fabric, and share external links 120 to communicate with each other. In addition, in some embodiments, the packets transferred through links 120 may use serial communication protocols. Therefore, compared to other types of communication systems, such as one with dedicated wires (e.g., dedicated wires with parallel communication protocols) between every two SOCs, the communication systems of system 100 in FIG. 1 provides more scalability. Two, with the share of links 120, the number of wires for coupling the SOCs with each other can be reduced. As a result, the size of system 100 can become smaller. In addition, because the number of wires is reduced, the SOCs may be placed closer to each other, which can result in faster speed and lower latency for communications between the SOCs. Moreover, when the number of wires within links 120 decrease, the spacing required for connecting the wires to each SOC and thus the size of the interface circuits may become smaller as well. This can reduce the size and also design and manufacturing complexity of the SOCs.

In some embodiments, interface circuit 102 may include a plurality of communication devices, e.g., unidirectional transmitters, unidirectional receivers, and/or bidirectional transceivers. The communication devices of interface circuit 102 may be dynamically controlled, e.g., to transition from a regular state to one or more low power states and vice versa as needed. For example, when system 100 enters a low power mode. As described above, in some embodiments, this may include idling of the GPU, CPU, and/or other SOC components. For example, in an idle mode, the display may remain on, whereas the GPUs of system 100 may enter a low power state or be turned off. As a result, only a reduced amount of traffic may need to be transferred through interface circuit 102. Accordingly, SOC 10(1) may only need a partial part of the communication devices of interface circuit 102 to meet the traffic requirement between SOC 10(1) and other SOCs 10(2)-10(4). Therefore, in some embodiments, one or more of the communication devices of interface circuit 102 may be transitioned into a low power state.

In some embodiments, SOC 10(1) may use bridge circuit 104 to control the power state of the communication devices of interface circuit 102. For example, system 100 enters a low power mode, when the GPUs of system 100 enter a low power state or are turned off. This may be detected by SOC 10(1), and in response an indication may be generated to cause a subset of the communication devices of interface circuit 102 into a low power state. The subset may include one or more of the communication devices. In some embodiments, the indication may be obtained by bridge circuit 104. Accordingly, bridge circuit may generate at least one signal for the subset of communication devices of interface circuit 102. The signal from bridge circuit 104 may be obtained by interface circuit 102, which may in turn transition the subset of communication devices from the regular state to a low power state. At meantime, interface circuit 102 may still maintain another subset, e.g., the other communication devices in the regular state.

Figure 2:
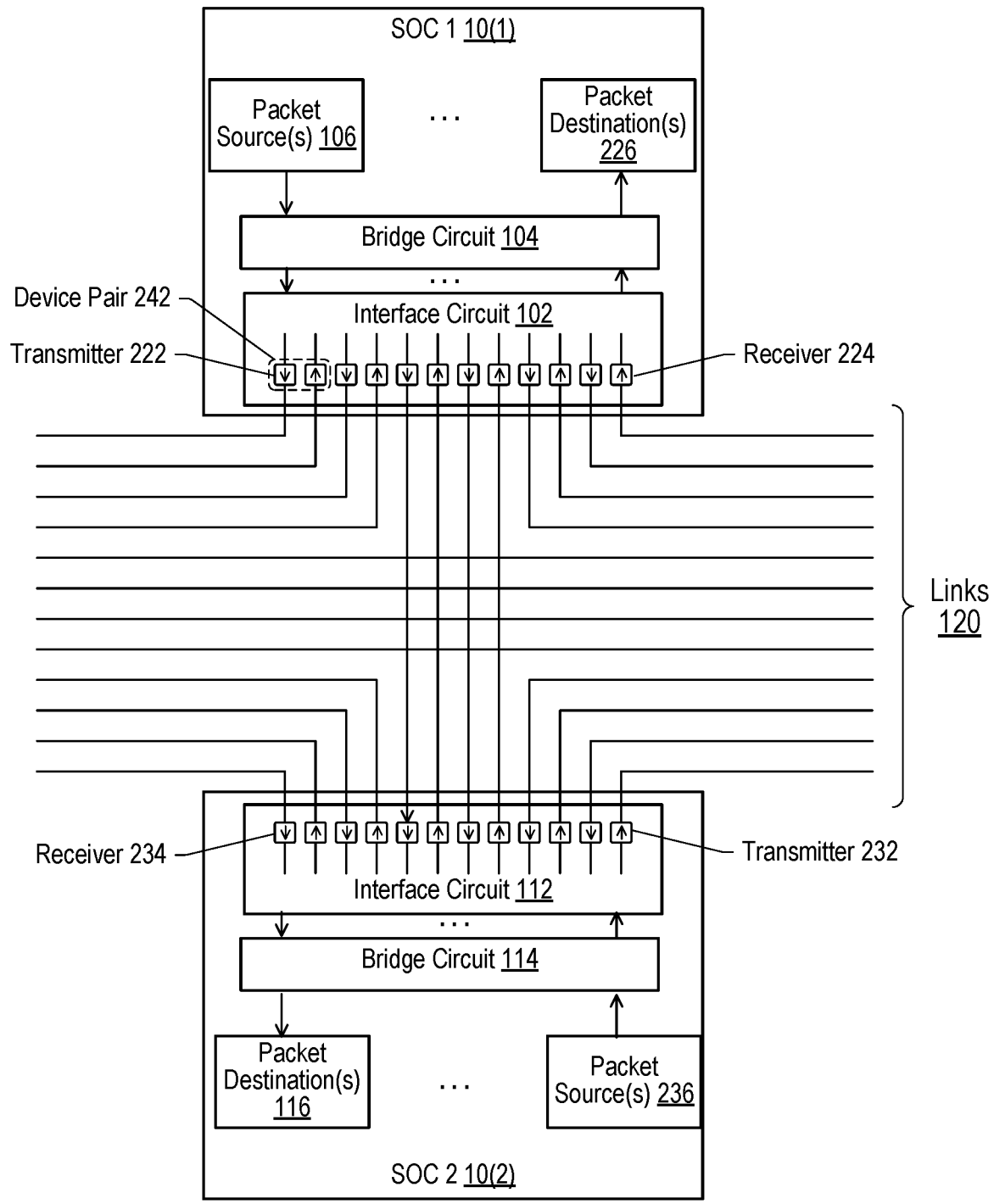
FIG. 2 is a block diagram of an example interface circuit of an SOC according to some embodiments.

Turning now to FIG. 2, a block diagram of an example interface circuit of an SOC according to some embodiments is shown. For purposes of illustration, only two SOCs 10(1) and 10(2) are shown in FIG. 2, but the description herein may also apply to other SOCs. In the illustrated example, the interface circuit of each SOC 10(1)-10(2) may include a plurality of communication devices. For example, interface circuit 102 of SOC 10(1) may include a plurality of transmitters 222 and receivers 224. Similarly, interface circuit 112 of SOC 10(2) may include a plurality of transmitters 232 and receivers 234. For purposes of illustration, in this example, the communication devices are displayed as unidirectional communication devices. In some embodiments, the communication devices may be bidirectional communication devices, e.g., bidirectional transceivers. In this example, one transmitter 222 and one receiver 224 may be considered a pair to provide bidirectional communications. In this example, interface circuits 102 and 112 may each include 6 pairs of transmitter and receiver.

Data of SOC 10(1) may be sourced from packet source(s) 106. The data may be transferred through the local communication fabric of SOC 10(1) to bridge circuit 104. As described above, in some embodiments, the local communication fabric of the SOC and links 120 external to the SOC may use different communication protocols, e.g., parallel vs. serial protocols. Therefore, in some embodiments, bridge circuit 104 may further convert the data from one protocol format to another, and then transmit the resultant data packets to interface circuit 102. Further, bridge circuit 104 may identify the routing paths and destinations for respective packets as part of the packing process. Accordingly, interface circuit 102 may transfer the packets to the appropriate destinations, e.g., packet destination(s) 116 of SOC 10(2) according to the routing instructions. Similarly, data packets may be sourced from packet source(s) 236 of SOC 10(2), and received by packet destination(s) 226 of SOC 10(1) through interface circuit 102 and bridge circuit 104.

In some embodiments, system 100 may enter a low state mode. For example, system 100 may enter a low power mode, e.g., an idle mode with the display on. As a result, an indication may be generated and obtained by bridge circuit 104 of SOC 10(1). Bridge circuit 104 may determine that one or more of transmitters 222 and receiver 224 of interface circuit 102 may transition to a low power state. For purposes of illustration, in this example, it is assumed that transmitter 222 and receiver 224 in device pair 242 may be able to be transitioned to the low power state. Accordingly, bridge circuit 104 may generate one or more power state control signals for transmitter 222 and receiver 224 of device pair 242. Interface circuit 102 may obtain the signals generated from bridge circuit 104, and then transition transmitter 222 and receiver 224 of device pair 242 to the low power state. In some embodiments, the power state control signals for the communication devices of interface circuit 102 may be on a one-to-one basis. In that case, bridge circuit 104 may generate two power state control signals respectively for transmitter 222 and receiver 224 in device pair 242.

As described in more detail in following sections, in some embodiments, interface circuit 102 may include one or more power control circuits for the communication devices of interface circuit 102. For example, interface circuit 102 may include 12 power control circuits, one for each of the 12 devices (e.g., transmitters 222 and receivers 224). In that case, when interface circuit 102 obtain the power state control signals from bridge circuit 104, interface circuit 102 may accordingly use the respective power control circuits corresponding to transmitter 222 and receiver 224 of device pair 242 to transition transmitter 222 and receiver 224 into the low power mode.

In some embodiments, the low power state of a communication device (e.g., transmitter 222 or receiver 224) may be implemented by lowering the clock frequency of the communication device, lowering a supply voltage of the communication device, or a combination of which. Further, in some embodiments, there may be more than one low power state. For example, assuming the data rate used by a communication device to transfer packets at a regular state is DR, a communication device may be adjusted to a data rate of DR/2 in a first low power state, DR/4 in a second low power state, DR/8 in a third low power state, . . . , until being completely turned off In other words, when some of the communication devices of interface circuit 102 enter the low power state, interface circuit 102 may use the remaining communication devices still in the regular state to transfer packets at a regular data rate, and use the transitioned communication devices in the low power state to transfer packets at a reduced data rate.

As described above, in some embodiments, transmitters 222 and receivers 224 of interface circuit 102 may transfer packets to/from links 120 according to a serial communication protocol. Therefore, transmitters 222 and receiver 224 of interface circuit 102 may respectively include a serializer and a deserializer. If the communication devices are bidirectional, e.g., transceivers, the communication devices may each include a serializer and a deserializer.

In some embodiments, the communication devices of interface circuit 102 may correspond to different external SOCs. For example, as indicated in FIG. 2, the left 4 communication devices may be responsible for transferring packets to/from SOC (3) on the left (not shown in FIG. 2), the middle 4 communication devices for transferring packets with SOC 10(2), and the right 4 communication devices for transferring packets with SOC 10(4) on the right (not shown in FIG. 2). In that case, according to the information of the packets (e.g., sources and/or destinations of the packets, routing paths, etc.) needed to be transferred during the low power mode of system 100, SOC 10(1) may dynamically adjust and identify the appropriate communication devices to be transitioned. For example, when system 100 enters the low power mode, if there are still data packets needed to be transferred with SOC 2 10(2), SOC 10 (1) may transition communication devices not corresponding to SOC 10(1), e.g., transmitter 222 and receiver 224 of device pair 242, to the low power state. When the data packets change to SOC 10(3), transmitter 222 and receiver 224 of device pair 24 may be transitioned back to the regular state, whereas other communication devices of interface circuit 102 may be controlled into the low power state. In some embodiments, the communication devices to remain in a regular mode after the transition may not necessarily all correspond to a same SOC. For example, depending on sources and destinations of packets needed to be transferred after the transition, two of the 4 communication devices on the left and two of the 4 communication devices in the middle may stay in the regular mode, while the other 8 communication devices may enter the low power state. Also, as described above, even in the low power state, interface circuit 102 may still use the communication devices to transfer packets at a reduced data rate. Therefore, in some embodiments, according to the information of the packets (e.g., sources and/or destinations of the packets, routing paths, etc.), SOC 10(1) may determine to route the packets to either the transitioned communication devices in the low power state or other communication devices in the regular mode.

In some embodiments, when the interface circuit of one SOC, e.g., interface circuit 102 SOC 10(1), enters a low power state, the interface circuits of other SOCs may not necessarily also enter a low power state, or enter the same low power state. In that case, the interface circuits of the different SOCs may operate according to different clock frequencies. For example, when transmitter 222 and receiver 224 in device pair 242 of SOC 10(1) are transitioned to the low power state and operate at a reduced clock frequency, the receivers and transmitters of other SOCs, e.g., SOC 10(3) on the left (not shown in FIG. 2), may be still operating according to the regular, higher clock frequency. In that case, the communication devices of the two interface circuits may need to operate according to an asynchronous protocol, e.g., an asynchronous serial communication protocol. In some embodiments, the bridge circuits and/or interface circuits of the SOCs may control the communication devices to switch between different communication protocols, e.g., between synchronous and asynchronous serial communication protocols. For example, when transmitter 222 in device pair 242 of interface circuit 102 enter the low power state, SOC 10(1) may inform one or more other SOCs, e.g., SOC 10(3). In addition, additional bits may be added to the data packets transferred by transmitter 222 to indicate the start and end of each packet, so that corresponding receiver(s) of the notified SOCs, e.g., SOC 10(3), may be able to appropriately decode the packets. Similarly, when transmitter(s) of the notified SOCs, e.g., SOC 10(3), transmits data packets to receiver 224 in device pair 242 of interface circuit 102, additional bits may be added to the data packets so that receiver 224 may appropriate decode the received packets. Moreover, when transmitter 222 and receiver 224 in device pair 242 of interface circuit 102 exits the low power state and return to the regular mode, SOC 10(1) may notify the above-described SOCs, such that the communication devices may switch to a synchronous protocol, as needed.

Figure 3:
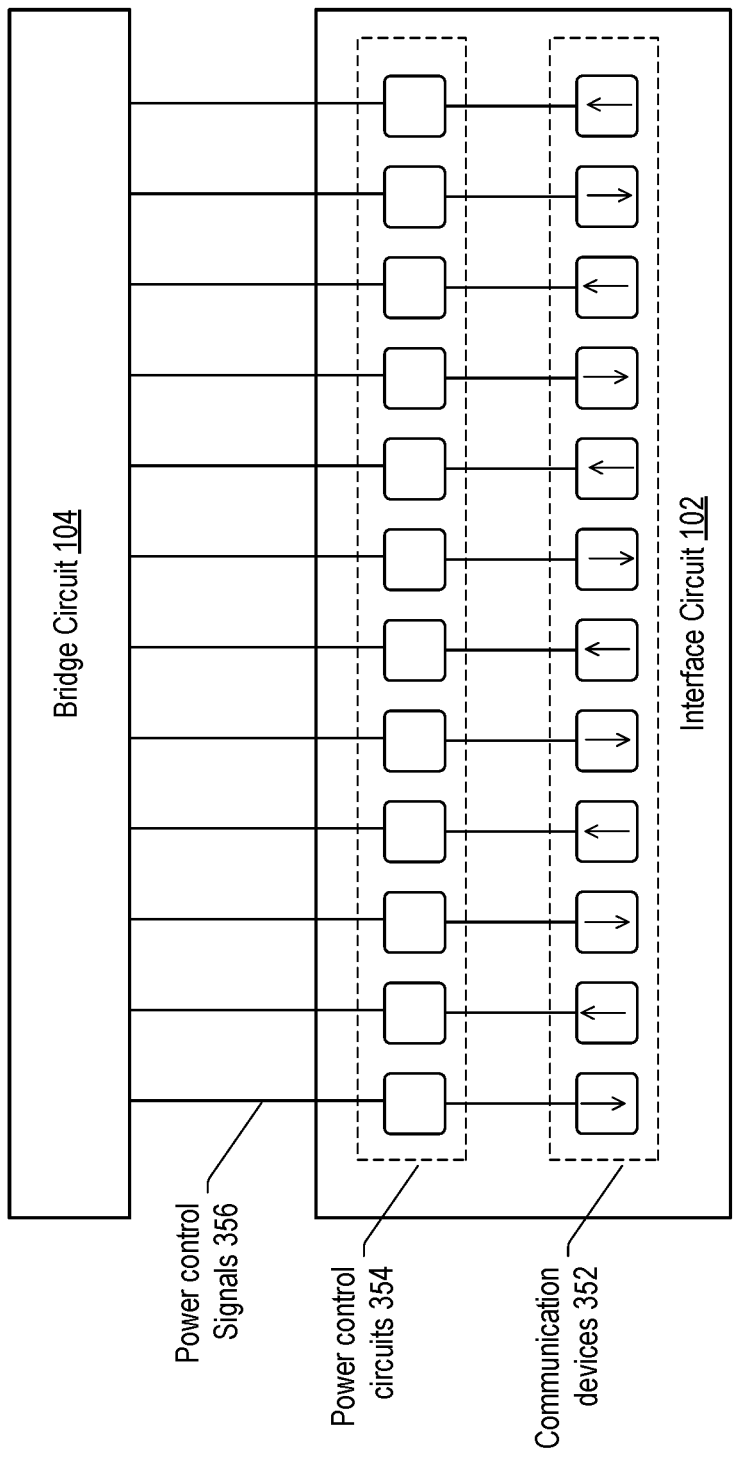
FIG. 3 is another block diagram of an example interface circuit of an SOC according to some embodiments.

Turning now to FIG. 3, another block diagram of an example interface circuit of an SOC according to some embodiments is shown. In some embodiments, interface circuit 102 may include a plurality of communication devices 352 (e.g., transmitters, receivers, and/or transceivers), and a plurality of power control circuits 354. In this example, power control circuits 354 may correspond to communication devices 352 on a one-to-one basis. To transition one or more of communication devices 352 to a low power state, interface circuit 102 may receive power control signals 356 from bridge circuit 102, corresponding to the one or more communication devices 352. Power control signals 365 may be obtained by one or more corresponding power control circuits 354, which may in turn transition the one or more communication devices 352 to the low power state. As described above, the low power state may be implemented by adjusting the clock frequency, supply voltage, or a combination of both, of the communication devices. Note that FIG. 3 is only provided as an example for purposes of illustration. In some embodiments, the power state control may not necessarily be based on the one-to-one basis. Instead, there may be one or more multiplexer and/or demultiplexer to aggregate and/or distribute control signals from bridge circuit 104 to the appropriate communication devices. In addition, in some embodiments, interface circuit 102 may include one or more other functional circuits, e.g., replay circuit, reply buffer, error checking and report circuit, etc.

Figure 4:
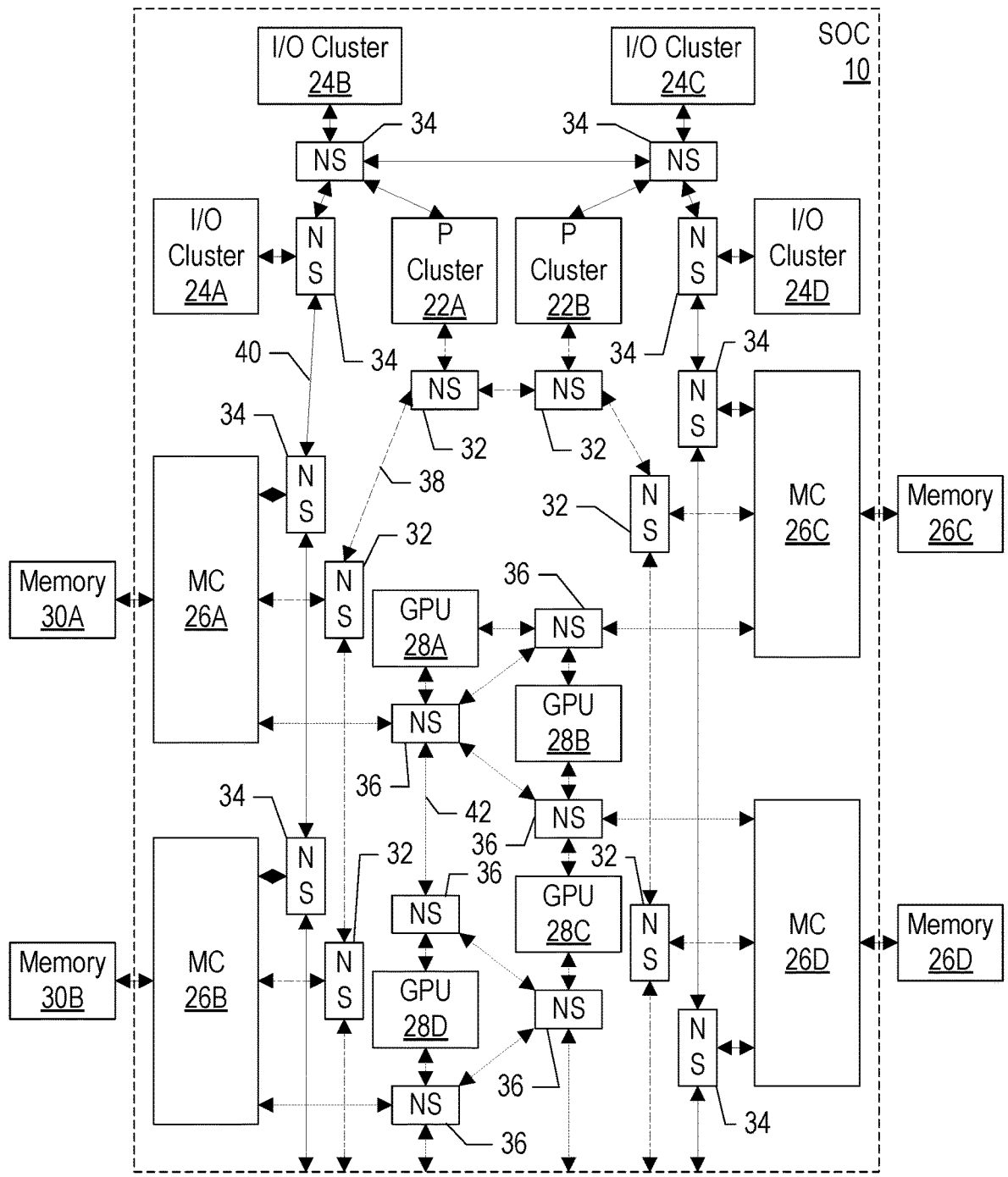
FIG. 4 is a block diagram of an example system on a chip (SOC) having multiple networks according to some embodiments.

Turning now to FIG. 4, a block diagram of an example system on a chip (SOC) having multiple heterogenous networks is shown. In the example of FIG. 4, SOC 10 includes a plurality of processor clusters (P clusters) 22A-22B, a plurality of input/output (I/O) clusters 24A-24D, a plurality of memory controllers 26A-26D, and a plurality of graphics processing units (GPUs) 28A-28D. As implied by the name (SOC), the components illustrated in FIG. 4 (except for the memories 30A-30D in this embodiment) may be integrated onto a single semiconductor die or "chip." However, other embodiments may employ two or more die coupled or packaged in any desired fashion. Additionally, while specific numbers of P clusters 22A-22B, I/O clusters 24A-24D, memory controllers 26A-26D, and GPUs 28A-28D are shown in the example of FIG. 4, the number and arrangement of any of the above components may be varied and may be more or less than the number shown in FIG. 4. The memories 30A-30D are coupled to the SOC 10, and more specifically to the memory controllers 26A-26D respectively as shown in FIG. 4.

As described above, SOC 10 may include a plurality of independent networks for connecting the various components on the SOC. For example, in the illustrated embodiment, the SOC 10 includes three physically and logically independent networks formed from a plurality of network switches ("NS") 32, 34, and 36 as shown in FIG. 4 and interconnect therebetween, illustrated as arrows between the network switches and other components. Other embodiments may include more or fewer networks. The plurality of network switches 32, 34, and 36 are coupled to the plurality of P clusters 22A-22B, the plurality of GPUs 28A-28D, the plurality of memory controllers 26A-25B, and the plurality of I/O clusters 24A-24D as shown in FIG. 4. The P clusters 22A-22B, the GPUs 28A-28B, the memory controllers 26A-26B, and the I/O clusters 24A-24D may all be examples of agents that communicate on the various networks of the SOC 10.

In FIG. 4, a central processing unit (CPU) network is formed from a first subset of the plurality of network switches (e.g., network switches 32) and interconnect therebetween illustrated as short dash/long dash lines such as reference numeral 38. The CPU network couples the P clusters 22A-22B and the memory controllers 26A-26D. An I/O network is formed from a second subset of the plurality of network switches (e.g., network switches 34) and interconnect therebetween illustrated as solid lines such as reference numeral 40. The I/O network couples the P clusters 22A-22B, the I/O clusters 24A-24D, and the memory controllers 26A-26B. A relaxed order network is formed from a third subset of the plurality of network switches (e.g., network switches 36) and interconnect therebetween illustrated as short dash lines such as reference numeral 42. The relaxed order network couples the GPUs 28A-28D and the memory controllers 26A-26D. In some embodiments, the relaxed order network may also couple selected ones of the I/O clusters 24A-24D as well. As mentioned above, the CPU network, the I/O network, and the relaxed order network are independent of each other (e.g., logically and physically independent) and may have heterogenous communication requirements on transfer of their packets, e.g., ordering, latency, etc. In some embodiments, the protocol on the CPU network and the I/O network supports cache coherency (e.g., the networks are coherent). The relaxed order network may not support cache coherency (e.g., the network is non-coherent). The relaxed order network also has reduced ordering constraints compared to the CPU network and I/O network. For example, in an embodiment, a set of virtual channels and subchannels within the virtual channels are defined for each network. For the CPU and I/O networks, communications that are between the same source and destination agent, and in the same virtual channel and subchannel, may be ordered. For the relaxed order network, communications between the same source and destination agent may be ordered. In some embodiments, only communications to the same address (at a given granularity, such as a cache block) between the same source and destination agent may be ordered. Because less strict ordering is enforced on the relaxed-order network, higher bandwidth may be achieved on average since transactions may be permitted to complete out of order if younger transactions are ready to complete before older transactions, for example.

As described above, in some embodiments, SOC 10 may be designed to couple with one or more other instances of SOC 10 through interface and bridge circuits (e.g., interface circuit 102 and bridge circuit 104). Thus, as illustrated in FIG. 4, the networks extend to the bottom of the SOC 10 as oriented in FIG. 4. Interface circuit and bridge circuit (not shown in FIG. 4) may be used to communicate across SOC 10 to another SOC.

As described above, in some embodiments, data from/to components on some of the local networks on-SOC networks (e.g., CPU network and I/O network) of an SOC may need to comfort to an ordering model. In other words, if data packets from/to these local networks may need to be transferred through the interface circuit of the SOC according to their original order when generated by the packet sources. In a low state mode, the relaxed order network associated with GPU(s) of a system may become inactive, but the CPU network and/or I/O network may still remain active. Therefore, to implement the ordering requirement, in some embodiments, an SOC may use the same communication device of the interface circuit to transfer packets to/from these networks, so that packets directed to the same addresses are routed through same paths to maintain their original order. In some embodiments, the ordering may need to be maintained across data packets directed to a same cache line of a memory device, e.g., the same 128 Bytes of addresses of a memory device external to the SOC. In addition, the ordering requirement may apply data accesses in various sequences, such as read-write, write-read, write-write, and/or read-read. In other words, the interface circuit, under control of a bridge circuit as described above, may interface the different local networks of the SOC with networks of other external SOC to preserve corresponding communication requirements imposed by the heterogenous networks upon the packets, such that state transition of the interface circuit (e.g., from a regular state to a low power state, or vice versa) may be transparent to both a source and a destination of the communication and may not necessarily affect operations of the source and destination. At the same time, while maintaining the communication requirements of the source and destination, the interface circuit may enable the state transition to occur while communications remain ongoing, thus reducing the impact of the state transition on communication performance relative to, e.g., quiescing traffic across the interface prior to performing the state transition.

Figure 5:
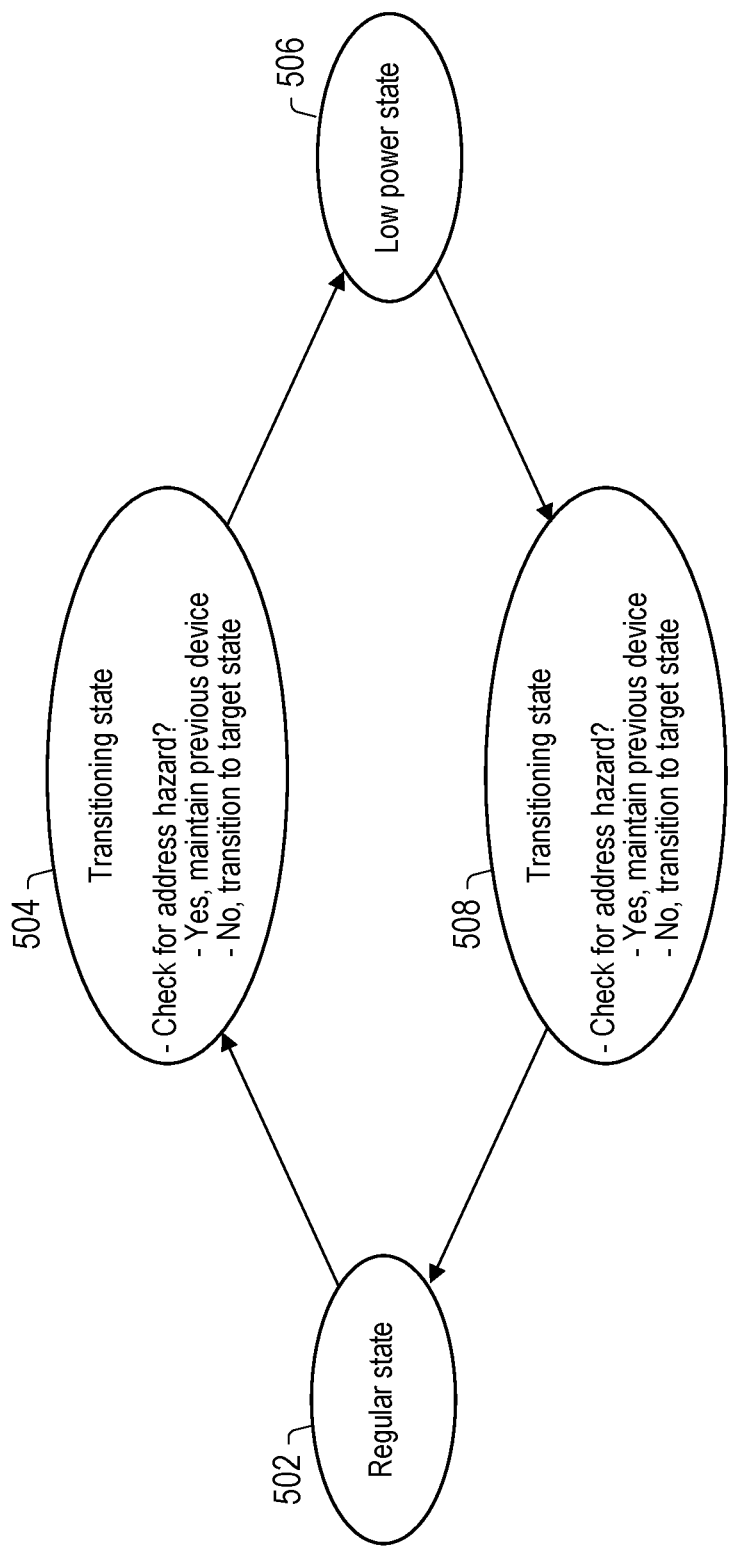
FIG. 5 is a block diagram of an example operation of an interface circuit to support an ordering model according to some embodiments.

Turning now to FIG. 5, a block diagram of an example operation of an interface circuit to support an ordering model according to some embodiments is shown. In FIG. 5, at beginning, an interface circuit (e.g., interface circuit 102) of an SOC (e.g., SOC 10(1)) may operate in regular mode 502. At a moment, a bridge circuit (e.g., bridge circuit 104) of the SOC may obtain an indication to cause a subset of the communication devices of the interface circuit from a regular state to a low power state, and move to transitioning state 504. During transitioning state 504, the bridge circuit may check for address hazards. For example, the bridge circuit may determine whether a packet pending to be transferred through the interface circuit is directed to a memory address (e.g., a cache line of a memory device) same as the packet that has been transferred through the subset of communication devices of the interface circuit. If there is such a pending packet, the bridge circuit may route this packet to the same subset of communication devices that was used to transfer the previous packet, so that this packet may be transferred through the same subset of communication devices as the previous packet. After the packet is successfully transferred through the same subset of communication devices, the bridge circuit may generate signals for the subset of communications devices to transition them from the regular state to low power state 506. In other words, the same subset of communication devices may not necessarily be transitioned from regular state 502 to low power state 506, until after the pending packet to the same memory address has been successfully transferred out of the SOC by the same subset of communication devices.

Conversely, when the SOC wants to transition the subset of communication devices of the interface circuit out of low power state 506 back to regular state 502, the bridge circuit may receive another indication and move to transitioning state 508. During transitioning state 508, the bridge circuit may check for address hazards to determine whether a pending packet to be transferred through the subset of communication devices of the interface circuit is directed to a memory address (e.g., a cache line of a memory device) same as the packet previously transferred through the subset of communication devices during the low power state. If so, the bridge circuit may route the pending packet to the same subset of communication devices that was used to transfer the previous packet during the low power state. After transfer of the pending packet completes, the bridge circuit may generate signals for the subset of communication devices to transition to regular state 502. In other words, the same subset of communication devices may not necessarily be transitioned from low power state 506 to regular state 502, until after the pending packet to the same memory address has been successfully transferred out of the SOC by the same subset of communication devices. In some embodiments, the time window within which the bridge circuit checks for the address hazards may be a constant or controllable time window, e.g., determined based on how long it may take a packet to reach the destination and/or how long a transfer response may be returned.

Figure 6:
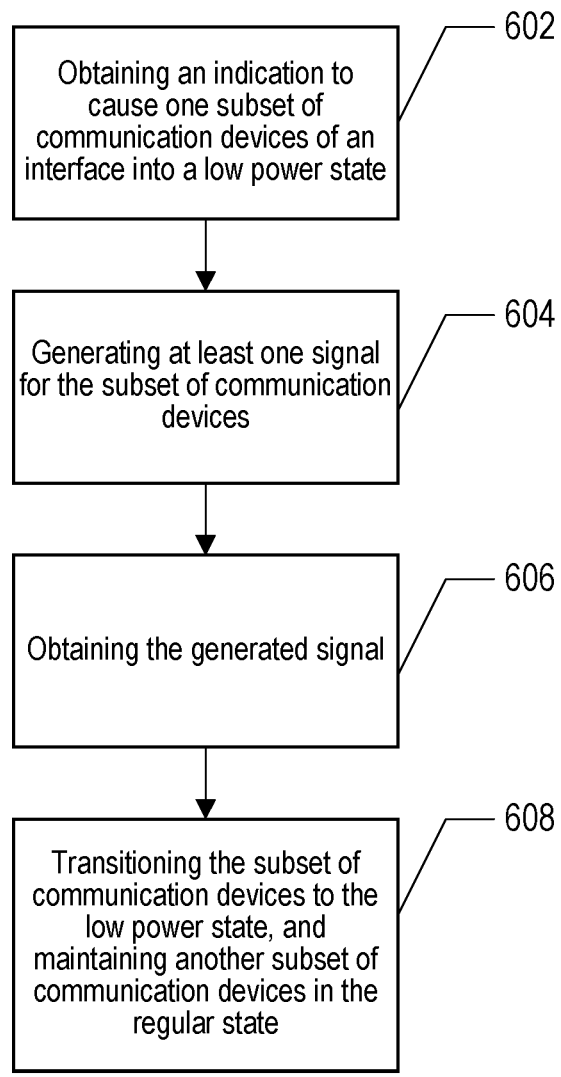
FIG. 6 is a flowchart showing an example process to dynamically control communication devices of an interface circuit of an SOC according to some embodiments.

Turning now to FIG. 6, a flowchart showing an example process to dynamically control communication devices of an interface circuit of an SOC according to some embodiments is shown. As indicated in this example, in some embodiments, when a system (e.g., system 100) enters a low power mode, e.g., an idle mode with a display on, the GPU(s) of the system may enter a low power state or be turned off.

Accordingly, an indication may be generated and obtained by the system, e.g., a bridge circuit (e.g., bridge circuit 104) of an SOC (e.g., SOC 10) of the system, to cause one subset of communication devices (e.g., a subset of one or more transmitters, receivers, and/or transceivers) of an interface circuit (e.g., interface circuit 102) of the SOC to a low power state, as indicated by block 602. In response to the indication, the bridge circuit may generate at least one signal for the subset of communication devices of the interface circuit, as indicated by block 604. The signal may be obtained by the interface circuit, as indicated by block 606. Accordingly, the interface circuit may transition the subset of communication devices from the regular state to the low power state according to the obtained signal, as indicated by block 608. At meantime, the interface circuit may still maintain another subset, e.g., the other communication devices, in the regular state, as indicated also by block 608. As described above, the low power state of the communication device may be implemented in one of many different ways, e.g., by adjusting a clock frequency of the communication device, a supply voltage of the communication device, a combination of both, etc. In addition, there may be one or more low power states for the communication device, e.g., as indicated by one or more reduced data rates to be used by the communication device to still transfer packets at the low power states, or by being completely turned off.

Figure 7:
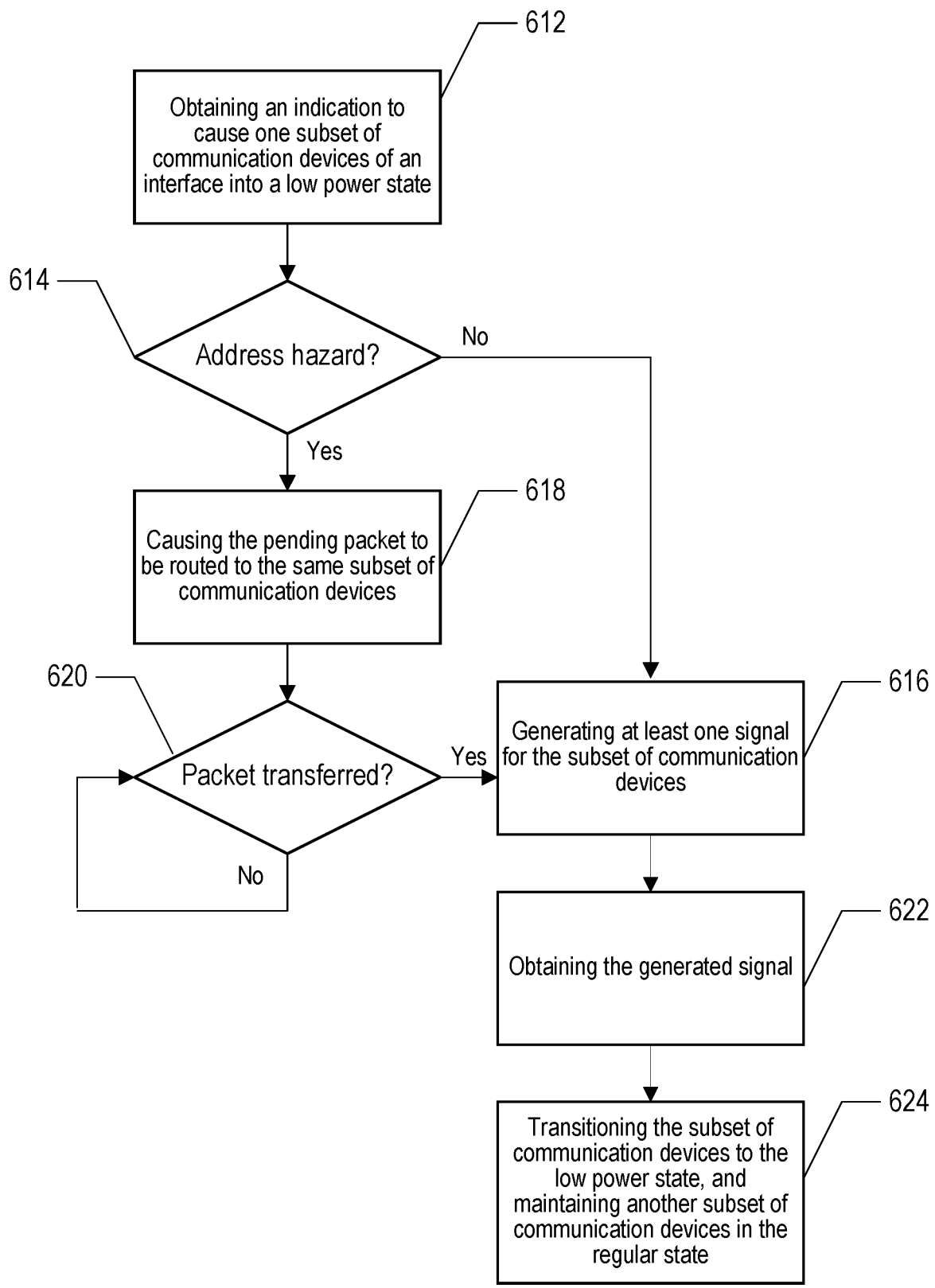
FIG. 7 is another flowchart showing an example process to dynamically control communication devices of an interface circuit of an SOC according to some embodiments.

Turning now to FIG. 7, another flowchart showing an example process to dynamically control communication devices of an interface circuit of an SOC according to some embodiments is shown. In this example, an indication may be obtained by a bridge circuit (e.g., bridge circuit 104) of an SOC (e.g., SOC 10) to cause a subset of communication devices (e.g., a subset of one or more transmitters, receivers, and/or transceivers) of an interface circuit (e.g., interface circuit 102) of the SOC to a low power state, as indicated by block 612. As described above, in some embodiments, packets transferred through the interface circuit may need to support an ordering model. Therefore, during a transitioning state from a regular state to the low power state, the bridge circuit may check for address hazards to determine whether there is any pending packet to be transferred through the interface circuit directed to the same address (e.g., the same cache line) of a memory device as a previous packet that was transferred by the interface circuit, as indicated by block 614. If no address hazard is detected, the bridge circuit may generate at least one signal for the subset of communication devices, as indicated by block 616. Otherwise, if an address hazard is detected, the bridge circuit may cause the pending packet to be routed to the same subset of communication devices of the interface circuit as the pervious packet, such that they may be transferred through the same subset of communication devices, as indicated by block 618. The bridge circuit may determine that the pending packet is successfully transferred through the same subset of communication devices, as indicated by block 620. After the packet is successfully transferred, the bridge circuit may generate at least one signal for the subset of communication devices, as indicated by block 616. The signal may be obtained by the interface circuit, as indicated by block 622, which may in turn transition the subset of communication devices to the low power state according to the obtained signal, as indicated by block 624. At meantime, another subset, e.g., the other communication devices, may be still maintained in the regular state, as indicated also by block 624. Similarly, in some embodiments, when the SOC transitions the subset of communication devices of the interface circuit out of the low power state back to a regular state, the SOC may also check for address hazards, as described above in FIG. 5.

In some embodiments, the above described traffic control techniques may be also applied to the local communication fabric of an SOC. For example, when an SOC enters an idle mode (e.g., caused by the idling of the SOC's GPU, CPU, and/or other components of the SOC), the SOC may diverge the traffic of an on-SOC network to a subset of the on-SOC network and transition the unused part of the on-SOC network into a low power state to achieve energy saving. The dynamic operation of getting in and out of the low power state for the unused part of the on-SOC network may be similar to what is described above with respect to the SOC-to-SOC communication fabric. For instance, consider the relaxed order network of GPUs 28A-28D in SOC 10 of FIG. 4 as an example. In some embodiments, one (or more) of the GPUs may enter an idling mode. In some embodiments, SOC 10 may identify the network switch(es) (e.g., one or more of NS 36) corresponding to the idled GPU, and transition the identified NS's into a low power state but maintain the other NS's in the regular state. In some embodiments, for transitioning the NS's in and out of the lower power state, SOC 10 may check for address hazards, e.g., to determine whether a pending packet to be transferred through the NS's is directed to a memory address same as the packet previously transferred through the NS's. If so, SOC may wait until after the pending packet has been transferred through the NS's, and then transition the NS's in or out of the lower power state. In addition, in some embodiments, operations of one on-SOC network may be transparent to and may not necessarily affect operations of other on-SOC networks, similar to what is described above with respect to the SOC-to-SOC communications. For example, in some embodiments, the transition of NS's between different states for the relaxed order network of SOC 10, as described in the above example, may not affect operations of the NS's for the CPU network and/or I/O network of SOC 10.

Figure 8:
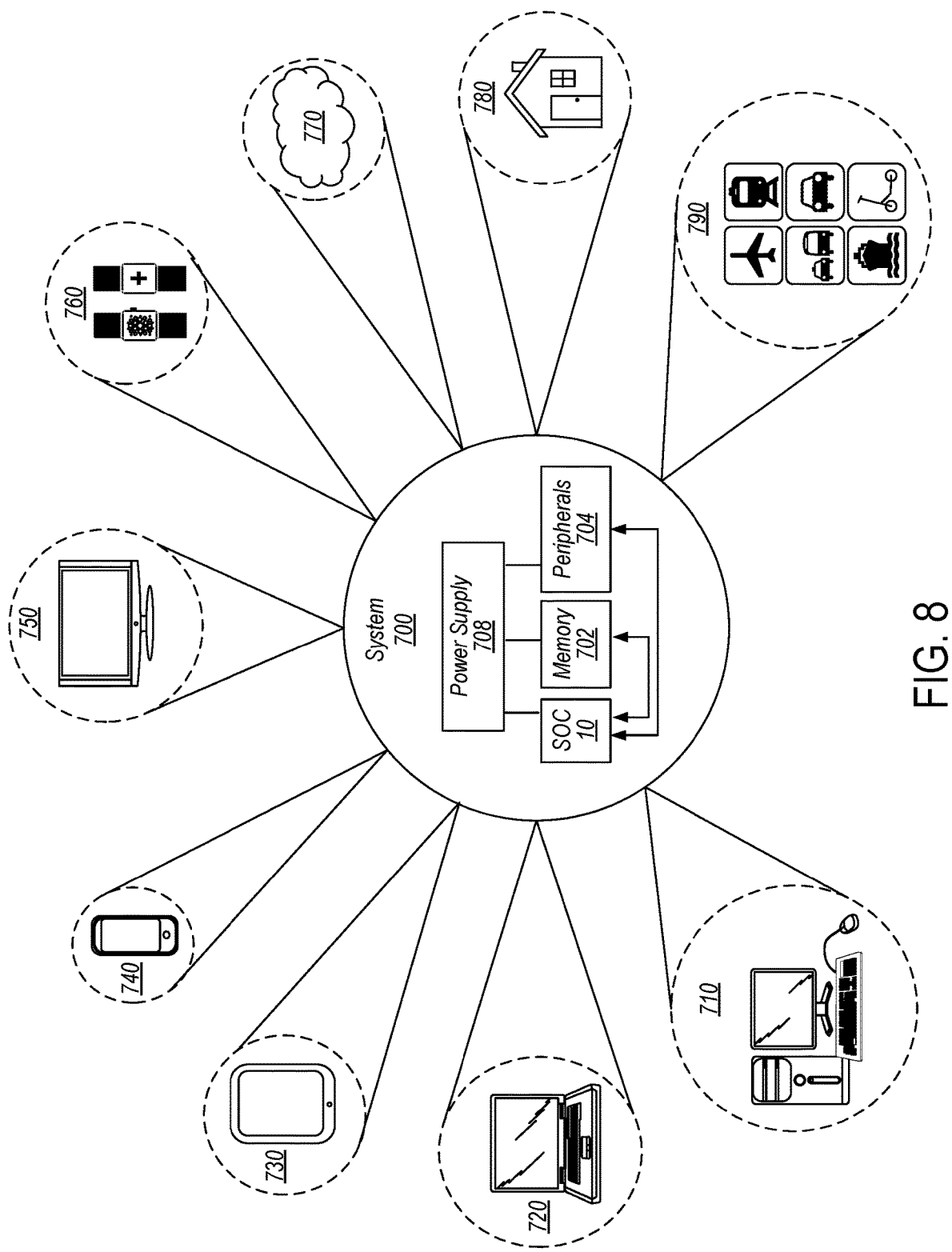
FIG. 8 is a block diagram of one embodiment of a system, including a plurality of instances of a system on a chip (SOC) in FIGS. 1-7, used in a variety of contexts.

Turning next to FIG. 8, a block diagram of one embodiment of a system 700 is shown. In the illustrated embodiment, the system 700 includes at least one instance of a system on a chip (SOC) 10 (as described above) coupled to one or more peripherals 704 and an external memory 702. A power supply (PMU) 708 is provided which supplies the supply voltages to the SOC 10 as well as one or more supply voltages to the memory 702 and/or the peripherals 704. In some embodiments, more than one instance of the 10 may be included (and more than one memory 702 may be included as well).

The peripherals 704 may include any desired circuitry, depending on the type of system 700. For example, in one embodiment, the system 704 may be a mobile device (e.g., personal digital assistant (PDA), smart phone, etc.) and the peripherals 704 may include devices for various types of wireless communication, such as Wi-Fi, Bluetooth, cellular, global positioning system, etc. The peripherals 704 may also include additional storage, including RAM storage, solid state storage, or disk storage. The peripherals 704 may include user interface devices such as a display screen, including touch display screens or multitouch display screens, keyboard or other input devices, microphones, speakers, etc. In other embodiments, the system 700 may be any type of computing system (e.g., desktop personal computer, laptop, workstation, net top etc.).

The external memory 702 may include any type of memory. For example, the external memory 702 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g., LPDDR, mDDR, etc.), etc. The external memory 702 may include one or more memory modules to which the memory devices are mounted, such as single inline memory modules (SIMMs), dual inline memory modules (DIMMs), etc. Alternatively, the external memory 702 may include one or more memory devices that are mounted on the SOC 10 in a chip-on-chip or package-on-package implementation.

As illustrated, system 700 is shown to have application in a wide range of areas. For example, system 700 may be utilized as part of the chips, circuitry, components, etc., of a desktop computer 710, laptop computer 720, tablet computer 730, cellular or mobile phone 740, or television 750 (or set-top box coupled to a television). Also illustrated is a smartwatch and health monitoring device 760. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 700 may further be used as part of a cloud-based service(s) 770. For example, the previously mentioned devices, and/or other devices, may access computing resources in the cloud (i.e., remotely located hardware and/or software resources). Still further, system 700 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 7 is the application of system 700 to various modes of transportation. For example, system 700 may be used in the control and/or entertainment systems of aircraft, trains, buses, cars for hire, private automobiles, waterborne vessels from private boats to cruise liners, scooters (for rent or owned), and so on. In various cases, system 700 may be used to provide automated guidance (e.g., self-driving vehicles), general systems control, and otherwise. These any many other embodiments are possible and are contemplated. It is noted that the devices and applications illustrated in FIG. 7 are illustrative only and are not intended to be limiting. Other devices are possible and are contemplated.

Computer Readable Storage Medium

Figure 9:
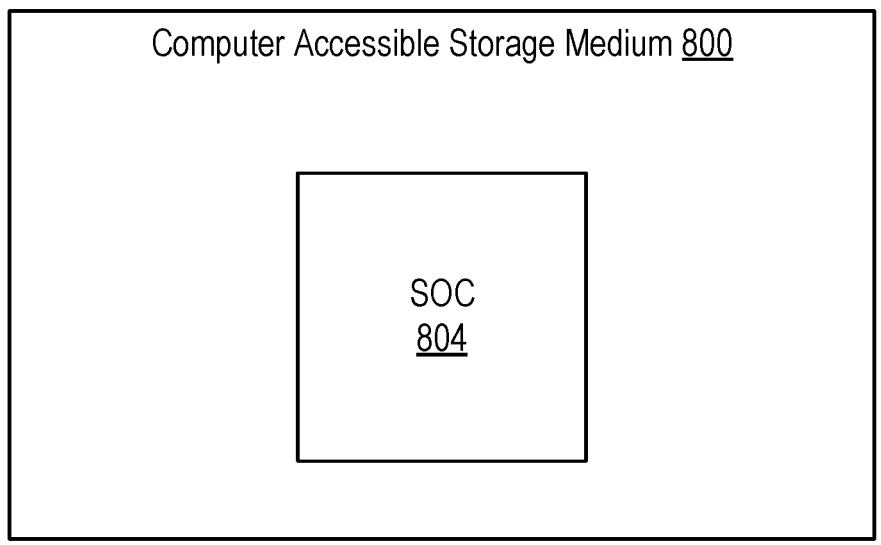
FIG. 9 is a block diagram of a computer accessible storage medium that may store a database representative of a system on a chip (SOC) in FIGS. 1-8.

Turning now to FIG. 9, a block diagram of one embodiment of a computer readable storage medium 800 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 800 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 800 in FIG. 9 may store a database 804 representative of the SOC 10 described above. Generally, the database 804 may be a database which can be read by a program and used, directly or indirectly, to fabricate the hardware comprising the SOC 10. For example, the database may be a behavioral-level description or register-transfer level (RTL) description of the hardware functionality in a high-level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the SOC 10. The netlist may then be placed and routed to produce a data set describing geometric shapes to be applied to masks. The masks may then be used in various semiconductor fabrication steps to produce a semiconductor circuit or circuits corresponding to the SOC 10. Alternatively, the database 804 on the computer accessible storage medium 800 may be the netlist (with or without the synthesis library) or the data set, as desired.

While the computer accessible storage medium 800 stores a representation of the SOC 10, other embodiments may carry a representation of any portion of the SOC 10, as desired, including any subset of the components described above. The database 804 may represent any portion of the above.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. A system on a chip (SOC), comprising:
an interface circuit comprising a plurality of devices configured to transfer packets between the SOC and one or more other SOCs external to the SOC, wherein the SOC and external SOCs are individually implemented on respective semiconductor dies, wherein the semiconductor die of the SOC is coupled with the semiconductor dies of the external SOCs via one or more serial communication links, and wherein the plurality of devices is configured to interface the SOC with the serial communication links; and
a bridge circuit configured to control the interface circuit, wherein the bridge circuit is configured to:
obtain an indication to cause a subset of the devices to transition from a regular state to a low power state; and
generate at least one signal for the subset of devices in response to the indication, and
wherein the interface circuit is configured to:
obtain the signal generated from the bridge circuit; and
transition the subset of devices from the regular state to the low power state according to the signal from the bridge circuit, and maintain another subset of the devices in the regular state.

2. The SOC of claim 1, wherein to generate the at least one signal, the bridge circuit is configured to:
determine whether a first packet to be transferred is directed to an address range same as a second packet that has been transferred through the subset of devices;
in response to a determination that the first packet to be transferred is directed to the address range same as the second packet that has been transferred, cause the first packet to be routed to the same subset of devices that was used to transfer the second packet;
determine whether the first packet has been transferred through the subset of devices; and
in response to a determination that the first packet is transferred through the subset of devices, generate the at least one signal to transition the subset of devices to the low power state.

3. The SOC of claim 1,
wherein the bridge circuit is further configured to:
obtain an additional indication to cause the subset of devices of the interface circuit to transition out of the low power state;
determine whether a first packet to be transferred is directed to an address range same as a second packet that has been transferred through the subset of devices during the low power state;
in response to a determination that the first packet to be transferred is directed to the address range same as the second packet that has been transferred, cause the first packet to be routed to the same subset of devices that was used to transfer the second packet during the low power state;
determine whether the first packet has been transferred through the subset of devices; and
in response to a determination that the first packet is transferred through the subset of devices, generate at least one additional signal for the subset of devices, and
wherein the interface circuit is further configured to:
obtain the at least one additional signal generated from the bridge circuit; and
transition the subset of devices out of the low power state according to the additional signal from the bridge circuit.

4. The SOC of claim 1, wherein the packets transferred by the interface circuit between the SOC and external SOCs include packets from or to heterogenous networks of the SOC.

5. The SOC of claim 1, wherein the interface circuit is configured to preserve different communication requirements associated with heterogenous networks of the SOC, such that transition of the subset of devices from the regular state to the low power state is transparent to the heterogenous networks of the SOC.

6. The SOC of claim 1, wherein the interface circuit comprises a plurality of power control circuits for respective ones of the plurality of devices, and wherein to transition the subset of devices to the low power state, the interface circuit is configured to (a) decrease a clock frequency of the subset of devices, (b) decrease a supply voltage of the subset of devices, (c) or a combination therefore, using a subset of the plurality of power control circuits corresponding to the subset of devices.

7. The SOC of claim 1, wherein to transition the subset of devices to the low power state, the interface circuit is configured to reduce a data rate used by the subset of devices to transfer packets.

8. The SOC of claim 1, wherein to transition the subset of devices to the low power state, the interface circuit is configured to turn off the subset of devices.

9. The SOC of claim 1, wherein the subset of devices comprises at least one of: a transmitter, a receiver, or a transceiver.

10. The SOC of claim 1, further comprising a graphic processing unit (GPU), wherein the indication to cause the subset of devices to the low power state is generated based on a detection that the GPU enters a low power state.

11. The SOC of claim 1, further comprising:
a plurality of processors;
a plurality of memory controllers configured to control access to memory devices; and
a plurality of peripheral devices.

12. The SOC of claim 2, wherein the address range corresponds to a cache line of an external memory device.

13. The SOC of claim 9, wherein the transmitter comprises a serializer, wherein the receiver comprises a deserializer, and wherein the transceiver comprises a serializer and a deserializer.

14. A system, comprising:
a plurality of systems on a chip (SOCs), wherein the SOCs are individually implemented on respective semiconductor dies that are coupled with each other via one or more serial communication links, and wherein an individual one of the SOCs comprises:
an interface circuit configured to interface the individual SOC with the serial communication links, wherein the interface circuit comprises a plurality of devices configured to transfer packets (a) from the individual SOC to other SOCs or (b) from the other SOCs to the individual SOC; and
a bridge circuit configured to control the interface circuit,
wherein the bridge circuit is configured to:
obtain an indication to cause a subset of the devices to transition from a regular state to a low power state; and
generate at least one signal for the subset of devices in response to the indication, and
wherein the interface circuit is configured to:
obtain the signal generated from the bridge circuit; and
transition the subset of devices from the regular state to the low power state according to the signal from the bridge circuit, and maintain another subset of the devices in the regular state.

15. The system of claim 14, wherein to generate the at least one signal, the bridge circuit is configured to:
determine whether a first packet to be transferred is directed to an address range same as a second packet that has been transferred through the subset of devices;
in response to a determination that the first packet to be transferred is directed to the address range same as the second packet that has been transferred, cause the first packet to be routed to the same subset of devices that was used to transfer the second packet;
determine whether the first packet has been transferred through the subset of devices; and
in response to a determination that the first packet is transferred through the subset of devices, generate the at least one signal to transition the subset of devices to the low power state.

16. The system of claim 14,
wherein the bridge circuit is further configured to:
obtain an additional indication to cause the subset of devices of the interface circuit to transition out of the low power state;
determine whether a first packet to be transferred is directed to an address range same as a second packet that has been transferred through the subset of devices during the low power state;
in response to a determination that the first packet to be transferred is directed to the address range same as the second packet that has been transferred, cause the first packet to be routed to the same subset of devices that was used to transfer the second packet during the low power state;
determine whether the first packet has been transferred through the subset of devices; and
in response to a determination that the first packet is transferred through the subset of devices, generate at least one additional signal for the subset of devices, and
wherein the interface circuit is further configured to:
obtain the at least one additional signal generated from the bridge circuit; and
transition the subset of devices out of the low power state according to the additional signal from the bridge circuit.

17. The system of claim 14, wherein to transition the subset of devices to the low power state, the interface circuit is configured to (a) reduce a data rate used by the subset of devices to transfer packets, or (b) turn off the subset of devices.

18. The system of claim 14, wherein the subset of devices comprises at least one of: a serializer transmitter, a deserializer receiver, or a transceiver having a serializer and a deserializer.

19. The system of claim 14, wherein the individual one of the SOCs further comprises:
a plurality of processors;
a graphic processing unit (GPU),
a plurality of memory controllers configured to control access to memory devices; and
a plurality of peripheral devices,
wherein the indication to cause the subset of devices to the low power state is generated based on a detection that the GPU enters a low power state.

20. A method, comprising:
obtaining, by a bridge circuit of a system of a chip (SOC), an indication to cause a subset of a plurality of devices of an interface circuit of the SOC from a regular state to a low power state, wherein the interface circuit transfers packets between the SOC and one or more other SOCs external to the SOC, wherein the SOC and external SOCs are individually implemented on respective semiconductor dies, wherein the semiconductor die of the SOC is coupled with the semiconductor dies of the external SOCs via one or more serial communication links, and wherein the plurality of devices interfaces the SOC with the serial communication links;
generating, by the bridge circuit, at least one signal for the subset of devices according to the indication;
obtaining, by the interface circuit, the at least one generated signal; and
transitioning, by the interface circuit, the subset of devices from the regular state to the low power state according to signal from the bridge circuit, and maintaining another subset of the devices in the regular state.

* * * * *